Feb. 1, 1949.  V. T. ERICKSON ET AL  2,460,341
ICE CUBE FORMING AND DISPENSING MACHINE
Filed July 12, 1945  2 Sheets-Sheet 1
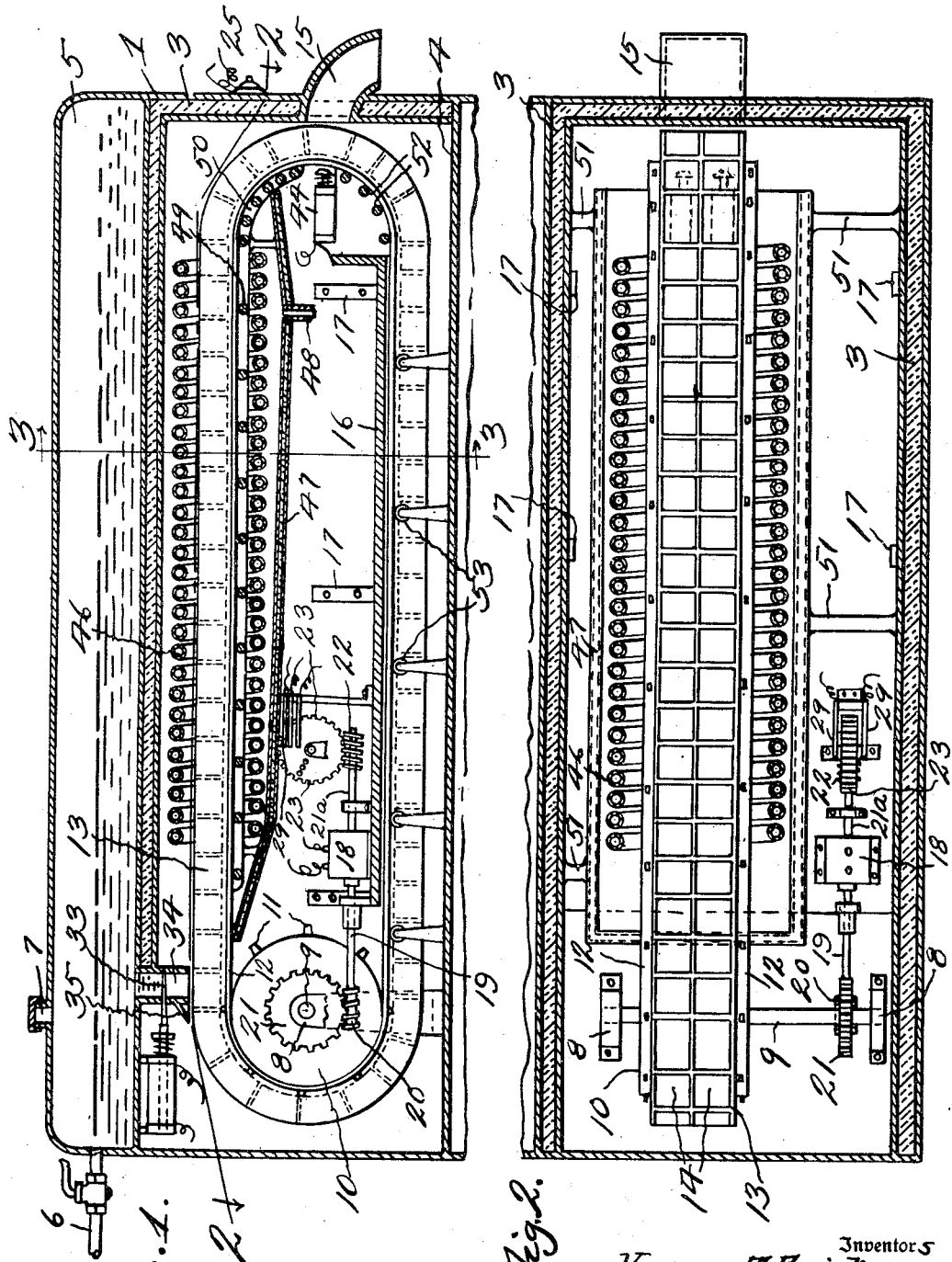
Inventors
Vernon T. Erickson
Earl F. Davis
By Philip A. H. Sewell
Attorney Feb. 1, 1949.    V. T. ERICKSON ET AL    2,460,341
ICE CUBE FORMING AND DISPENSING MACHINE
Filed July 12, 1945    2 Sheets-Sheet 2
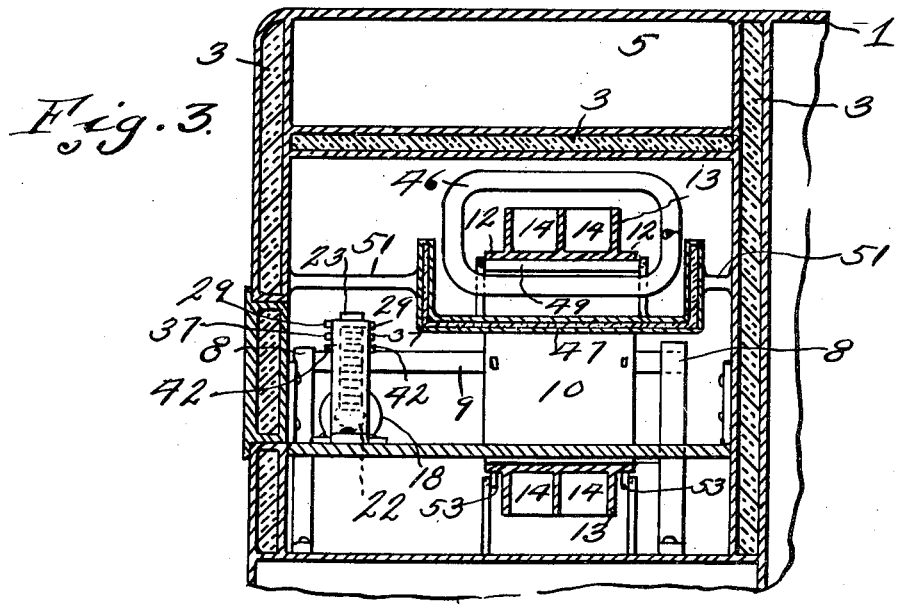
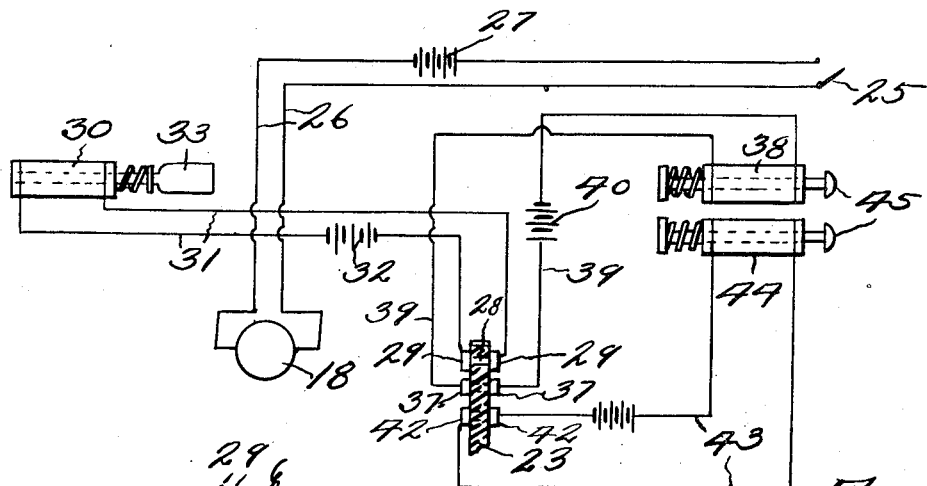
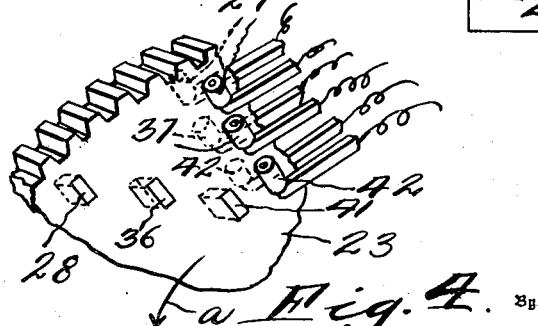
Inventors
Vernon T. Erickson
Earl F. Davis
Philip A. Terrell
Attorney Patented Feb. 1, 1949

2,460,341

UNITED STATES PATENT OFFICE 2,460,341

ICE CUBE FORMING AND DISPENSING MACHINE

Vernon T. Erickson and Earl F. Davis, Jacksonville, Fla.

Application July 12, 1945, Serial No. 604,672

4 Claims. (Cl. 62—106)

The invention relates to ice cube forming and dispensing machines or refrigerators, and has for its object to provide a device of this character, comprising an endless flexible belt having water receiving pockets therein, into which fluid is intermittently discharged for filling the pockets, and motor driven means for intermittently advancing the upper flight of the endless member for the freezing operation as cubes are intermittently discharged for use from the machine and into a receptacle.

A further object is to provide a driven drum geared to the endless member and driven by a motor which also rotates a switch element, which switch element controls a valve for filling the pockets in the endless member, and pusher members for forcing cubes from the endless member at the point of discharge.

A further object is to provide a framework between the upper and lower flights of the endless member for supporting the motor and switch and the cube discharging members. Also to provide a roller carrying frame for supporting the upper flight of the endless member and disposed within the convolutions of the freezing coil.

A further object is to provide a drip pan beneath the coil and supported by the casing and to support the roller carrying frame from the drip pan at the ends of the coil.

A further object is to provide opposite sides of the endless member with outwardly extending flanges to which the driving drum is geared and supporting rollers cooperating with the outer face of the flanges at the lower side of the endless member and supporting the lower flight of the endless member against sagging.

A further object is to provide a control switch adjacent the discharge spout for controlling the various solenoids and the motor.

A further object is to provide an insulated wall around the casing and between the coil and the water supply reservoir.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Fig. 1 is a vertical longitudinal sectional view through the device.

Fig. 2 is a horizontal sectional view taken on line 2—2 of Fig. 1.

Fig. 3 is an enlarged sectional view, transversely taken on line 3—3 of Fig. 1.

Fig. 4 is a detail perspective view of the circuit maker and breaker.

Fig. 5 is a diagrammatic view of the various circuits.

Referring to the drawings the numeral 1 designates the casing of the refrigerating device, which may be a portion of a conventional household refrigerator, or a complete unit for forming ice cubes. The casing 1 is provided with insulated walls 3 of conventional construction, and with a bottom 4 which supports the mechanism hereinafter set forth.

A water reservoir 5 is provided in the upper end of the casing which may be supplied from a supply pipe 6, or through the filling opening 7. Extending upwardly from the bottom 4, at the rear end, are upwardly extending brackets 8 in the upper ends of which brackets are journalled the ends of the transverse shaft 9 having a driven drum 10 thereon. Drum 10 is provided with teeth 11, extending into apertures in the outwardly extending flanges 12 of the endless flexible belt 13, preferably formed from rubber, and this belt is provided with transversely arranged pockets 14 for the reception of water to be frozen into cubes. During the operation of the belt, as hereinafter set forth, the pockets 14 are moved to discharge position at the discharge spout 15, intermittently; in other words in each cycle of operation the belt is moved a distance corresponding to only one pocket.

Extending transversely through the belt is platform 16, supported by brackets 17, attached to the side walls of the casing, and mounted on the rear end of the platform is the motor 18 having a rearwardly extending shaft 19, terminating in a worm gear 20, which worm gear meshes with a gear 21 carried by the shaft 9. Motor 18 also drives the forwardly extending shaft 21a and terminating in a worm 22, which worm meshes with a fiber or insulation gear 23. Motor 18 is of a standard type, which, on each operation, makes a predetermined number of revolutions and then stops until again energized, hence an intermittent starting and stopping is accomplished. Motors of this type have built into them a special cut off switch to cut off current after the required number of revolutions, and to again start the motor it is necessary to again actuate the starter switch. The motor is so constructed with a cut off switch and so geared to the drum 10 that the drum will only be rotated sufficiently to successively register pockets of the belt with the discharge spout 15, and the gearing 22 proportioned to rotate the fiber gear 23 one revolution from the starting position and in the direction of the arrow $a$, said starting position being shown in Fig. 4.

Motor 18 is controlled by a switch 25 adapted to be closed by the operator, and which switch is in circuit with the motor 18 through the conductor wires 26 and battery 27; therefore it will be seen that when the dispensing operation is desired the operator starts the motor 18 which will move the belt successively one pocket. During this operation the fiber gear 23 makes one complete operation in the direction of the arrow a, and during this revolution the conductor contact 28 will first contact the conductor arms 29 and close the circuit to the oil retarded solenoid 30 through conductor wires 31 and battery 32. This will open the slide valve 33, allowing water from the reservoir 5 to pass through the discharge port 34, and into the pockets immediately thereunder for refilling the same. A splash apron 35 is preferably provided on the discharge member 34. By having an oil retarded solenoid there is a delayed action allowing the complete filling of the pockets. Following this action the contact member 36, carried by the fiber gear 23, engages the contact arms 37 on opposite sides of the fiber gear, and this closes the circuit to one of the cube discharging solenoids 38 through the conductor wires 39 and battery 40. This will punch one cube from the belt into the discharge spout 15, which may be received in a receptacle placed under the spout. The other cube is then discharged from the pocket into the spout when the contact 41 is engaged by the conductor arms 42, which closes the circuit through the wires 43 to the plunger solenoid 44. It will be seen that as the fibre wheel 23 rotates for the final discharge of the second cube from the belt that the second operation immediately follows the first discharge operation as contacts 36 and 41 are relatively close together. The solenoids 38 and 44 are provided with rounded heads 45 which will not injure the under side of the belt. It will be seen that by providing a lapse of time between the operation of solenoids 38 and 44 the cubes will be discharged one at a time into the spout, and the possibility of jamming is reduced to a minimum. All of the contacts, 28, 36 and 41, after closing the various circuits will be advanced beyond the circuit closing arms and the fiber gear 23 will be again at the starting point or line shown in Fig. 4.

The upper flight of the endless belt 13 extends through a conventional form of cooling coil 46, clearly shown in Figures 1 and 2, and the water in the belt pockets is frozen into cubes as the upper flight is intermittently advanced through the coil.

Extending transversely beneath the upper flight of the endless belt is an insulated drip tray 47 having a drain pipe 48, which may lead to any suitable source of discharge. The upper flight of the endless flexible belt rides over transversely disposed rollers 49, which rollers engage the underside of the belt and are carried by a frame 50. These parts are supported by the drain pan 47, and the drain pan is in turn supported by brackets 51, attached to the side walls 3 in any suitable manner. Additional rollers 52 are carried by the forward end of the platform 16 as shown in Figure 1 for maintaining the rounded form of the forward end of the belt. The lower flight of the belt is supported by bracket carried rollers 53 from the bottom 4 of the casing, thereby preventing sagging of the lower portion of the belt.

From the above it will be seen that an ice cube forming device is provided which is simple in construction, and one from which cubes of ice are intermittently discharged. It will also be seen that the insulated drip pan and insulated walls separate the various solenoids from the freezing coil so they will properly function at all times.

The invention having been set forth what is claimed as new and useful is:

1. A cube forming refrigeration device comprising an endless belt having pockets arranged in pairs for the reception of water, a freezing unit surrounding one flight of said endless belt, a discharge spout, means for intermittently advancing the belt one pair of pockets in relation to the discharge spout, means for successively filling each pair of pockets as the pockets advance towards the freezing unit, said means for advancing the belt and filling the pockets comprising a driven drum geared to the endless belt, a drive motor adapted to rotate said drum, a rotatable circuit maker and breaker geared to and driven by the motor and adapted to make one complete revolution during one advance of said pair of sockets, a water reservoir above the belt, a solenoid controlled valve for intermittently allowing water to pass from the reservoir into the pockets of the belt, side by side cube discharge solenoids within the belt, said circuit maker and breaker forming means for first opening the valve for the supply of water to the pockets, next operating one of said solenoids and finally operating the other cube discharging solenoid.

2. An ice cube forming machine comprising an endless flexible belt having water receiving pockets arranged in pairs therein, means for intermittently discharging water into the pockets, means for freezing the water in the upper flight of the belt as it is intermittently advanced, said means comprising a cooling coil transversely surrounding said flight of the belt, a drip pan beneath the upper flight of the belt, a roller carrying supporting frame carried by the drip pan and supporting the upper flight of the belt and rollers engaging the outer side of the lower side of the belt for preventing sagging of the belt.

3. A device as set forth in claim 2 including side flanges carried by the belt, a drive drum for the belt geared to said side flanges, said supporting rollers for the under side of the endless belt engaging said side flanges.

4. A device as set forth in claim 2 wherein the means for driving the belt comprises a driven drum geared to the belt, a supporting platform extending transversely through the belt between the upper and lower flights thereof, a drive motor carried by said platform, a rotatable circuit maker and breaker carried by said platform, a transmission system for said motor being capable of imparting one revolution to the circuit maker and breaker and to rotate the drum the distance equal to one pocket of the endless belt, a water supply solenoid controlled valve for the belt, discharge pusher solenoids for the ice cubes, said circuit maker and breaker forming means whereby the valve is first opened, one of the pusher solenoids operated and finally the other pusher solenoid operated.

VERNON T. ERICKSON.
EARL F. DAVIS.

REFERENCES CITED

The following references are of record in the file of this patent:

UNITED STATES PATENTS

| Number | Name | Date |
|---|---|---|
| 1,857,122 | Sherman | May 3, 1932 |
| 2,025,711 | Bemis | Dec. 31, 1935 |
| 2,054,101 | Short | Sept. 15, 1936 |
| 2,432,597 | Toulmin | Dec. 16, 1947 |